April 23, 1963   J. R. DUKES ETAL   3,087,061
COMPOSITION INSENSITIVE BETA RAY GAUGING SYSTEM
Filed April 14, 1960   4 Sheets-Sheet 1

INVENTORS
John R. Dukes
Denman H. Allemang
Anthony D. Cennamo

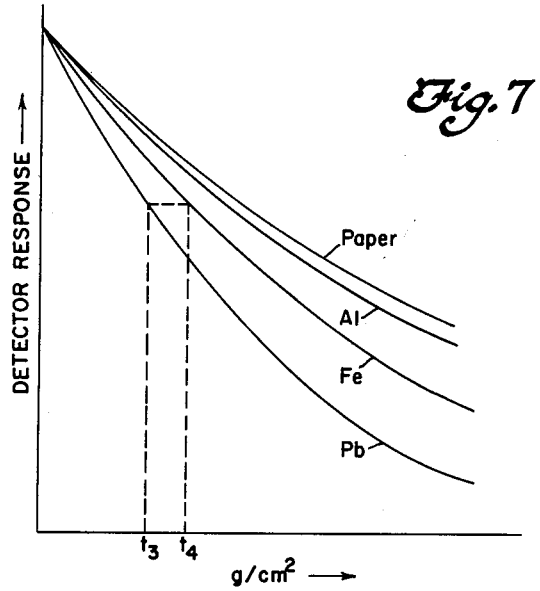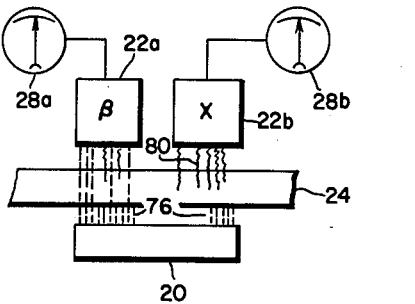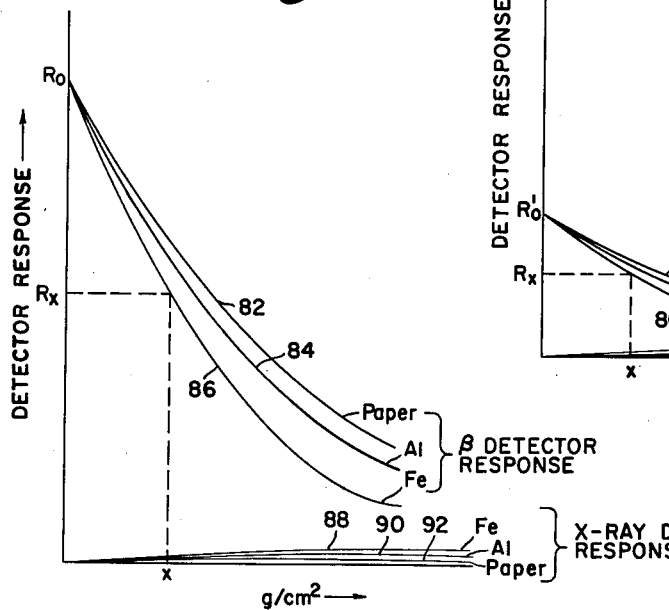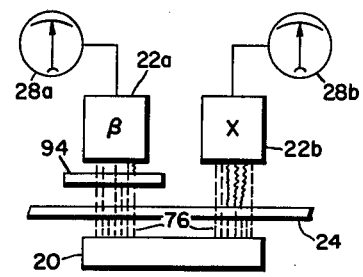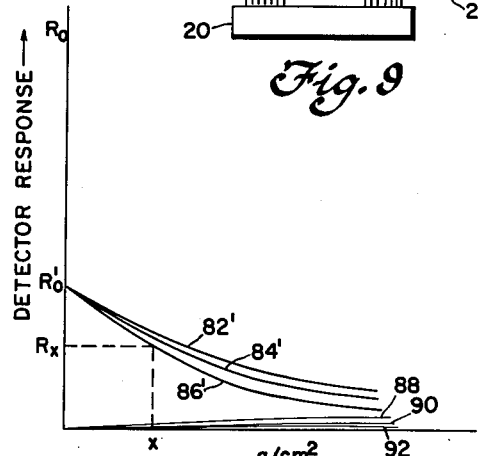

April 23, 1963 J. R. DUKES ETAL 3,087,061
COMPOSITION INSENSITIVE BETA RAY GAUGING SYSTEM
Filed April 14, 1960 4 Sheets-Sheet 4

INVENTORS
John R. Dukes
Denman K. Allemang
By Richard D. Cennamo

United States Patent Office
3,087,061
Patented Apr. 23, 1963

3,087,061
COMPOSITION INSENSITIVE BETA RAY
GAUGING SYSTEM
John R. Dukes and Denman K. Allemang, Columbus, Ohio, assignors to Industrial Nucleonics Corporation, a corporation of Ohio
Filed Apr. 14, 1960, Ser. No. 22,215
8 Claims. (Cl. 250—83.3)

This invention relates to beta radiation gauges for measuring the properties of materials, and more particularly it relates to methods and means for rendering such gauges practically insensitive to changes in the atomic constituents of the measured material.

In comparison with other types of radiation gauges, instruments employing beta absorptiometry are characterized by an inherent ability to measure mass with a rather remarkable independence of composition variations. However, it is well known that beta radiation absorption is subject to second order effects which are dependent on changes in the so-called effective atomic number of the measured material, and for this reason it is mandatory that each gauge be specially calibrated for the particular material to be measured. Accordingly, calibration problems arise when a particular gauge is to be used for measurement of a variety of materials having significantly different compositions. In the past, the solutions to these problems have not been completely satisfactory.

There are now available radiation gauges of advanced design which admit of permanent calibration. Moreover, these gauges are available in so-called range-switching and/or composition-switching models having means for permanently recording a plurality of pre-calculated calibration settings which can be switched into the measuring circuits at the turn of a selector dial. However, each additional calibration which is to be provided according to this system adds considerably to the initial cost of the instrument and the labor of the specialist who is required to calibrate the same.

In accordance with another expedient which has been used, a set of omnibus type range-setting dials are provided, together with a more or less comprehensive set of tabular data, whereby the user of the gauge can refer to the tables, find his particular material composition and desired range of measurement given therein, note the values of the associated dial settings and thereafter place these dial settings on the instrument. This system has the disadvantage of a high initial calibration expense because of the amount of skilled labor expended in deriving the calibration tables, and moreover it is subject to human error in the use thereof.

In other situations, the user of the instrument simply relies on the fact that in a permanently calibrated gauge the composition deviation is predictable and reproducible, provided that the composition of the measured material is maintained substantially constant by the usual quality control methods. It often happens that most of the materials produced by a particular manufacturing process are measurable with sufficient accuracy with an "average" type calibration, and in the occasional instance where an abnormal composition is run, a specific correction factor for the predictable gauging error is included in the product specification.

It is apparent, however, that the above-listed expedients, and other less practical methods which are occasionally employed, all involve extra expense, inconvenience and the possibility of error. Moreover, none of these expedients is effective in the case where composition is subject to variation in an unpredictable manner.

In accordance with this invention we have recognized the practical significance of the fact that when the transmission of beta radiation through the measured material decreases as the result of an increase in the effective atomic number thereof, there is a concomitant increase in the X-radiation which is generated when the beta rays bombard the atoms of the measured material, and vice versa. Hence in essence we provide beta radiation gauging apparatus having means for deriving a signal which is responsive both to the transmitted beta rays and to the generated X-rays, and methods and means for adjusting the relative magnitudes of the two contributions to said signal so as to establish a condition wherein the aforesaid decrease in beta transmission is effectively canceled by the aforesaid increase in X-ray generation, and vice versa.

Therefore it is an object of this invention to provide methods and means for improving the accuracy of beta radiation gauging instruments.

It is also an object to provide methods and means for reducing the undesirable inherent composition sensitivity of such instruments.

It is another object to provide beta radiation gauges capable of rendering a mass indication which is substantially independent of variations in the effective atomic number of the measured material.

It is still another object to provide a method of calibrating a beta radiation gauging instrument for composition insensitive response to mass changes in the measured material.

It is yet another object to provide a method and means for rendering a beta radiation gauge insensitive to normal composition variations without altering the basic mechanical or electrical design of the instrument.

Further objects and advantages will become apparent in the following explanation of the invention and the detailed description of certain preferred embodiments thereof, with reference being made to the accompanying drawings, in which:

FIG. 6 is a graph showing typical absorption curves as encountered in connection with prior art beta gauging apparatus.

FIG. 7 is a showing of a beta radiation gauge having a dual detector and indicator system to illustrate the theory of the present invention.

FIG. 8 is a graph comparing the expected response characteristics of the detectors of FIG. 7.

FIG. 9 is a modification of FIG. 7, illustrating a principle of the present invention.

FIG. 10 is similar to FIG. 8, illustrating the effect of the apparatus modification of FIG. 9.

Before proceeding with a description of the present invention, it is profitable to quickly review certain well-known physical principles on which the same depends, and which must be fully appreciated in order to properly understand the nature and scope of the invention. To the extent permitted by presently available knowledge, these principles have been expounded with appropriate mathematical rigor in standard texts devoted to nuclear physics; for example, see R. D. Evans, The Atomic Nucleus, McGraw-Hill, 1955. Accordingly the obvious over-simplification and minor inaccuracy of the following brief explanation is to be appreciated, but is deemed justifiable in view of the concise and graphic discussion which is appropriate herein.

Figure 1:
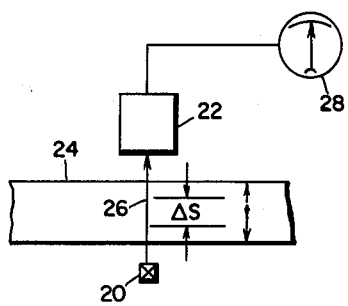
FIG. 1 is a showing of the elements of a typical beta radiation gauge, illustrating one phase of the beta ray absorption process.

FIG. 1 depicts the well-known basic geometry of a beta ray gauge for measuring material properties such as weight per unit area, density and the like. This device comprises a beta radiation source 20 and a detector 22 disposed on opposite sides of a material 24. For illustrative purposes, the thickness of the material 24 is greatly exaggerated.

Consider the hypothetical case of a beta particle traversing the path indicated by the arrow 26. As the particle traverses the material 24 it loses kinetic energy along the way by a combination of several mechanisms. Usually the predominant mechanism of energy loss is inelastic collision with atomic electrons in the material 24. In each such collision, in general a small portion of the beta particle's energy is imparted to one or more atomic electrons which assume either an excited state, or an unbound state which leaves the atom at least temporarily ionized. For convenience herein, the energy loss of the beta particle in either or both cases is referred to as ionization loss.

Since the total ionization loss is proportional to the number of collisions, one can intuitively predict what is actually the case, that the ionization loss per unit length $\Delta S$ of the path of the beta particle is proportional to the electron density of the material, i.e., the number of atomic electrons per cubic centimeter thereof, which is given by $$nZ = \left(\frac{\rho N}{A}\right)Z = \rho N\left(\frac{Z}{A}\right) \tag{1}$$

wherein $n$ is the number of atoms per cubic centimeter, $Z$ is the atomic number of the material, $\rho$ is its density in grams per cubic centimeter, $N$ is Avogadro's number and $A$ is the atomic weight of the material.

Since the ratio $Z/A$ has a nearly constant value of about ½ for all elements except hydrogen, it is customary to measure distances along the path 26 of the particle in units of $\rho\Delta S$, e.g., grams per square centimeter, so that absorption measurements become fairly independent of the physical structure and composition of the material.

However, the deviation of the ratio $Z/A$ from the constant value is by no means negligible; for example, for aluminum it is about 0.48, for iron 0.46, for lead about 0.40, and in general the ratio decreases with increasing $Z$. This means that a beta particle traveling through a given distance (in g./cm.²) of an absorber will encounter a substantially smaller number of atomic electrons in a high Z material than in a low Z material.

It follows that the beta particle loses less energy in traversing the high Z material. Moreover this effect is intensified by the fact that the transfer of energy to the atomic electrons is a quantum-mechanical phenomenon. Thus each excitation or ionization event requires a discrete minimum value of energy transfer, or the event will not take place at all. In high Z materials, the atomic electrons are more tightly bound than in low Z materials, and hence if the geometric mean energy of all the allowed excitations and ionizations is represented by $I$, the same is closely proportional to $Z$, that is, $$I \simeq kZ \tag{2}$$

wherein $k$ is an empirical constant factor of around 12 electron volts. This means that many potential collision situations which result in energy transfer in the case of low Z materials become simply "near misses," wherein no energy is transferred, in the case of high Z materials.

Figure 2:
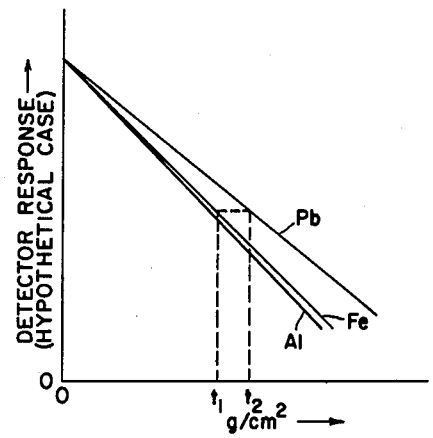
FIG. 2 is a graph showing hypothetical beta absorption curves, illustrating the effects of changes in the ratio $Z/A$ (as hereinafter defined) and the accompanying variation in ionization potentials for different materials, but neglecting the effects of nuclear scattering of beta particles.

The effects of Z on ionization loss per unit path length can be graphically illustrated by considering a hypothetical beta gauging situation wherein an indicating instrument 28 is provided to indicate the response of the detector 22 as the thickness of the absorber material 24 is varied. It is assumed that the beta particles emitted by the source 20 have a uniform velocity, that $t$ is given in units of $\rho\Delta S$ and that $\Sigma\rho\Delta S = t$. The expected results are shown in FIG. 2, which compares the "absorption curves" for lead, iron and aluminum. It is seen that the curves diverge in accordance with the differences in Z, and hence if the gauge is calibrated for iron, for example, and if a lead sample having a thickness $t_2$ is then placed in the gauge the same will indicate the value $t_1$, the composition error being equal to $(t_1 - t_2)$.

The situation depicted in FIG. 2 is of course contrary to ordinary experience because it does not take into account other phenomena such as the effect of elastic collisions with the atomic nuclei which result in multiple scattering of the light beta particles. When a fast beta particle passes close to an atomic nucleus, and particularly when it traverses the region between the nuclear radius and the atomic K-shell, it is subjected to the powerful attractive coulomb forces exerted by the protons in the nucleus. These forces constrain the beta particle to a hyperbolic orbit around the center of mass which it shares with the nucleus. Since the mass of the beta particle is so small compared to the mass of the nucleus, practically the beta orbits around an essentially stationary nucleus and thereby suffers a large deflection.

Figure 3:
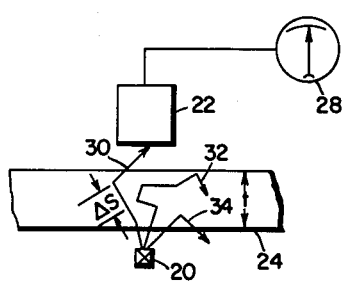
FIG. 3 is similar to FIG. 1, illustrating the effects of nuclear scattering.

The effects of nuclear elastic scattering of beta particles are illustrated in FIG. 3. Herein it is seen that because of scattering the path as at 30 of a beta particle is not straight through the material 24, and hence its path length $\Sigma\rho\Delta S$ is always greater than the thickness $t$ of the material. Multiple scattering causes complete absorption of many very energetic beta particles as is shown by the path 32 of a straggler which would have penetrated the material 24 with high residual energy had the thickness $t$ been very slightly less. Some appreciation of the magnitude of nuclear elastic scattering is obtained by observing the substantial character of the familiar beta backscatter gauge response. Such a gauge of course utilizes the significant number of beta particles which penetrate only a small distance into the material 24 and are reflected backwardly toward the source side thereof, as is shown by the path 34 of one such a backscattered particle.

The nuclear scattering cross sections, per atom, increase as a function of $Z^2$ for different materials. There is also a slight degree of scattering of beta particles by elastic collisions with atomic electrons, so that the total scattering cross sections, per atom, increases approximately as a function of $(Z^2+Z)$. Therefore the scattering effects depicted in FIG. 3 become more severe with increasing Z, thus providing another source of composition error which fortunately is in the opposite direction from the other composition error illustrated in FIG. 2. This mutual error compensation effect explains the relative insensitivity of beta absorption instruments to composition variations, particularly those instruments using certain combinations of sources, detectors and geometrical arrangements thereof.

It has long been known that X-rays are generated when high speed electrons, such as beta particles, collide with matter, e.g., a target. X-rays are a mixture of two "types" of radiation, the so-called line spectra or characteristic X-rays and the continuous spectra or bremsstrahlung. When by an inelastic collision a beta particle knocks an electron out of the K, L or M shell, one or more monochromatic X-rays are generated as the atom refills the vacancy, thus producing the characteristic radiation. The predominant constituent of X-rays, however, is the bremsstrahlung which is generated primarily in inelastic collisions of high speed electrons with nuclei. It is well known that when electric charges are accelerated they will radiate electromagnetic energy, for example, as forced oscillations of electric currents in an antenna generate radio waves. The beta particle carries a unit negative charge which is accelerated by the coulomb force exerted by the protons in the nucleus whenever the beta particle is deflected thereby. However, all collisions which produce major deflections of beta particles (scattering) do not generate bremsstrahlung, because coupling necessarily occurs between the electron (beta particle) and the electromagnetic field of the emitted photon (X-ray). Hence the cross-sections for radiative collisions are much smaller than the cross-sections for nuclear elastic scattering by a factor of $$\frac{2\pi e^2}{hc} = \frac{1}{137} \quad (3)$$

the so-called fine structure constant, wherein $e$ is the charge on the electron, $h$ is Planck's constant and $c$ is the velocity of light. Nonetheless a significant amount of X-rays are always associated with a beta ray source.

Figure 4:
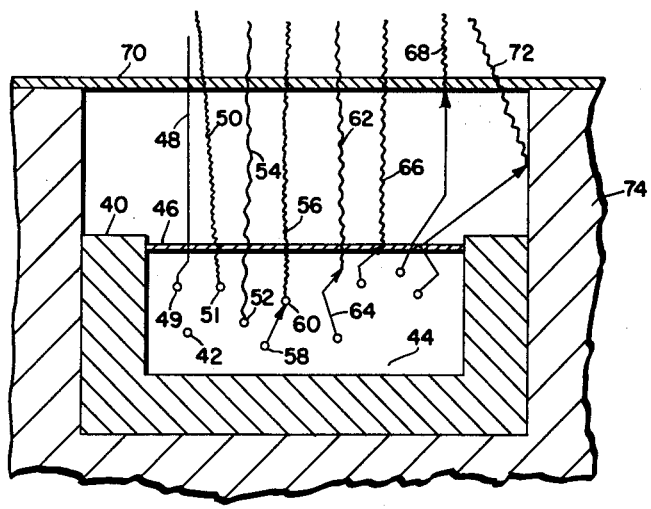
FIG. 4 is a sketch representing the structure of a typical beta radiation source, illustrating various mechanisms of radiation conversion.

The production of X-rays by a so-called pure beta ray source such as $Sr^{90}$ is illustrated in FIG. 4. The customary source comprises a capsule 40 containing radioactive material comprising radioactive atoms as at 42 imbedded in a binder or matrix material 44. The source material is hermetically sealed inside capsule 40 by means of a thin barrier 46 which is readily penetrable by the majority of the beta particles as shown by the path 48 of a beta particle emitted by the radioactive atom 49.

When many of the radioactive atoms emit beta particles, they also within themselves generate either or both characteristic X-rays and the so-called internal bremsstrahlung. The internal bremsstrahlung as at 50 is attributed to the sudden change in nuclear charge which accompanies the beta particle emission from an atom as at 51. The passage of the emitted beta particle out through the electron cloud of an emitting atom as at 52 can knock an electron out of the K shell, or occasionally the L or M shells thereof, resulting in subsequent emission of characteristic X-rays as indicated at 54.

External bremsstrahlung as at 56 is frequently generated when a beta particle emitted by one radioactive atom as at 58 collides with another radioactive atom as at 60 in the source material. External bremsstrahlung as at 62 is also frequently generated when a beta particle traversing a path as at 64 collides with an atom (not shown) of the matrix material 44, or as at 66 by a collision in the barrier 46, or as at 68 by a collision in an external "window" 70 which is customarily used on top of the source housing to protect the source, or as at 72 by a collision in any shielding material 74 or source housing construction placed around the source.

Figure 5:
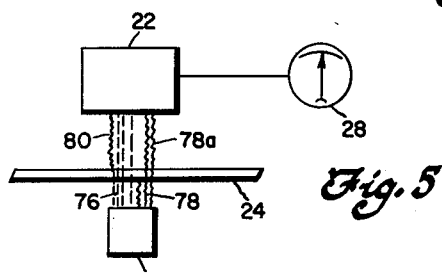
FIG. 5 is similar to FIG. 1, illustrating various radiation phenomena occurring in a typical beta radiation gauging situation.

From the above considerations, it is apparent that the usual beta radiation gauging situation is as illustrated in FIG. 5, wherein a "beta ray" source 20 emits a preponderance of beta radiation energy 76 mixed with a significant quantity of X-ray energy 78. In passing through the material 24 the beta radiation is attenuated by the mechanisms hereinabove described, including radiative collisions in the material 24 which generate X-rays as indicated at 80. Obviously FIGS. 4 and 5 llustrate only the portion of beta and X-radiations which are projected in the direction of the material 24 and the detector 22.

In passing through the material 24, the X-radiation 78 is attenuated through absorption by the well-known mechanisms of photoelectric interaction, Compton scattering and, for X-rays whose photon energy exceeds 1.02 mev., by pair production. The average energy $E_{AVE}$ of the X-rays generated by the beta emitter radioisotopes used in gauging is usually less than about 0.1 mev., and the most prominent absorption mechanism in this energy region is photoelectric interaction. This effect is powerfully dependent on the atomic number Z; the cross-section per atom $a^\tau$ being given empirically by $$a^\tau \simeq \text{const } Z^{n'} \quad (4)$$

wherein $n'$ is a number which varies with the energy $h\mu$ of the X-ray and has a value of about 4.0 for the X-rays ($E_{AVE} < 0.1$ mev.) associated with the usual beta ray source. Considering also Equation 1 therefore, the absorption of X-rays 78 is approximately a function of $Z^5/A$.

In summary, the usual prior art beta gauging situation involves at least all the mechanisms hereinabove set forth. The variation in ionization loss per unit path length of beta particles penetrating the material, and the changing value of $$\left(\frac{Z}{A}\right)$$

tend to make the gauge read "light" if Z increases. Nuclear scattering of beta particles, and the absorption of X-rays accompanying the beta ray source both tend to make the gauge read "heavy" if Z increases. The beta ray scattering and X-ray absorption effects outweigh the first-mentioned effects, and hence there is a net increase in the overall radiation energy absorption by the material 24 as the effective Z thereof increases.

FIG. 6 is a showing of absorption curves for different materials. These curves are typical of a prior art beta gauge, and correlate the response of the detector 22 and indicator 28 of FIG. 5 with increasing thicknesses of materials 24. These curves moreover diverge in the well-known fashion, the curves for the high Z materials exhibiting greater "sag" than the curves for low Z materials. Hence if the gauge is calibrated for iron, for example, and a lead sample having the thickness $t_3$ is placed in the gauge, the same will indicate the value $t_4$, the composition error being equal to $(t_4 - t_3)$. In this actual situation, the direction of the error is the opposite of the hypothetical situation of FIG. 2.

With the above theoretical and practical considerations in mind, the present invention was conceived on the basis of a theory which can be satisfactorily explained with reference to FIGS. 7–11.

FIG. 7 is a similar to FIG. 5, except that the universal detector 22 is replaced by a pair of separate detectors 22a and 22b, each having its own respective indicator shown at 28a and 28b. Assume an ideal situation wherein the source 20 emits only beta rays completely free from X-radiation, wherein the detector 22a is sensitive to beta rays but completely insensitive to X-rays, and wherein the detector 22b is sensitive to X-rays but completely insensitive to beta rays.

The expected performance of this hypothetical set-up is shown in FIG. 8, wherein the absorption curves to be obtained from the beta detector 22a for paper, aluminum, and steel are respectively indicated at 82, 84 and 86. The composition deviation of these curves will be considerably less severe than in the usual case (FIG. 6), but nonetheless due to nuclear elastic scattering the deviation will be qualitatively similar and quite appreciable.

The expected response of the detector 22b to the X-rays 80 generated in the measured material is shown by the curves 88, 90 and 92 for paper, aluminum and steel respectively. The ordinates $R_x$(conv.) of these curves are estimated from the approximate relation $$R_x \text{ (conv.)} \simeq \frac{1}{2}(R_0 - R_x)ZE(10^{-3}) \qquad (5)$$

wherein $R_x$(conv.) is the estimated response of the detector 28b as a function of the fractional portion of the absorbed beta radiation which is converted to X-rays, $R_0$ is the response of the beta detector 22a when the thickness of the absorber 24 is zero, $R_x$ is the response of the beta detector when the absorber thickness is $x$, $Z$ is the effective atomic number of the material 24 and $E_0$ is the maximum energy (in mev.) of the beta rays 76 from the source 20 thereof.

It is apparent from FIG. 8 that if the X-ray detector response is added to the beta detector response, the deviation of curves 88—92 tends to compensate for the opposite deviation of curves 82—86. However, the degree of compensation effected is relatively small, and unfortunately the relative amount of X-rays generated in the material 28 cannot be increased.

Figure 11:
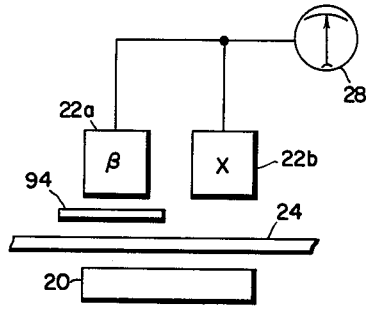
FIG. 11 is a showing of a beta ray gauging apparatus in accordance with one form of the invention.

It is possible, however, to reduce the beta detector response, for example, by placing an absorber 94 between the material 24 and the beta detector 22a as is shown in FIG. 9. As is illustrated in FIG. 10, this reduces all ordinates of curves 82—86 including the maximum response $R_0$ which reduces to $R_0'$. While the reduction of the other ordinates is not strictly proportional to $$\frac{R_0 - R_0'}{R_0}$$

because of the changed energy distribution of beta rays reaching the detector 22a, the relative deviation of curves 86 is expected to remain about the same. Moreover, the deviation of curves 82'—86' now has a magnitude comparable to the deviation of curves 88—92; and it is readily seen that if the changed beta detector response is added to the X-ray detector response, effective compensation should obtain. The addition of the two signal components can be effected by simply connecting both detectors 22a and 22b in parallel to the indicating system 28 as illustrated in FIG. 11.

Figure 12:
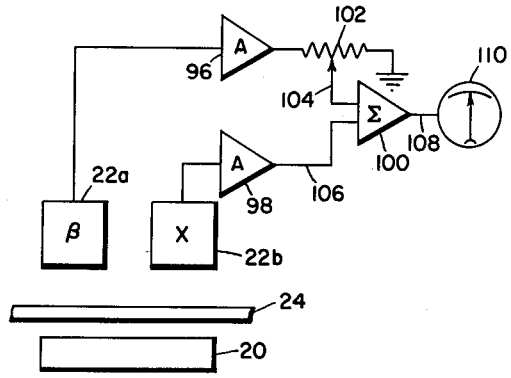
FIG. 12 is an apparatus in accordance with another form of the invention.
Figure 13:
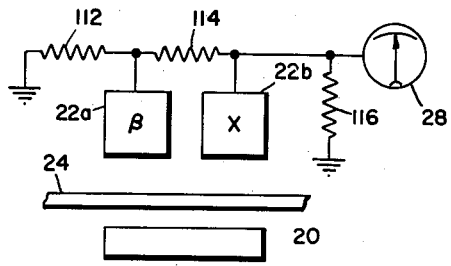
FIG. 13 is an apparatus in accordance with still another form of the invention.

A similar result may be obtained without the use of the beta absorber 94 by means of the devices shown in FIGS. 12 and 13. In FIG. 12 the outputs of the detectors 22a and 22b are amplified in separate channels by amplifiers 96 and 98 and then added by conventional means such as a summing amplifier 100. The amplified beta detector output appears across a potentiometer 102 which permits adjustment of the relative amplitude of the beta ray detector signal component on line 104 which is summed with the X-ray detector signal component on line 106. The combined signal at the output 108 of the summing amplifier provides a mass-indicative signal, substantially independent of composition variations, which is delivered to a suitable indicating system 110.

In FIG. 13, a portion of the output current from beta detector 28a is shunted to ground for example, by a resistor 112, and the desired remaining portion is added through a resistor 114 to the output of the X-ray detector 22b.

However, in a gauge designed for automatic operation in an industrial plant environment, there are certain practical disadvantages connected with the systems of FIGS. 12 and 13. FIG. 12, for example, requires the three amplifiers 96, 98 and 100 which must be highly stable, and because of the high impedance signals involved at least amplifiers 96 and 98 must be stabilized and periodically "standardized" by special, rather elaborate procedures such as set forth in U.S. Patent 2,829,268. In FIG. 13, for example, resistors 112 and 114 as well as the conventional detector load resistor 116 must have extremely high values of the order of one to ten billion ohms, the choice of resistance values is very limited and very wide tolerances obtained; so that proper combinations are seldom readily available. By reason of these and other considerations, it appears that the system of FIG. 11 is the most practical of the embodiments of the invention hereinabove described.

Figure 14:
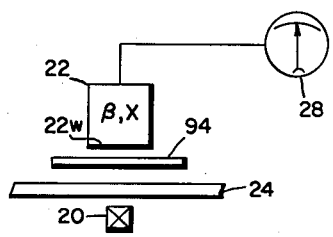
FIG. 14 is a beta ray gauging apparatus in accordance with the preferred embodiment of the invention.

Our preferred embodiment of the invention, however, is shown in FIG. 14, wherein it is seen that the beta and X-ray detectors of FIG. 11 are combined in the single detector 22. As is well known, the great majority of industrial beta gauges utilize a single ionization chamber type detector which has good sensitivity in both beta and X-radiation unless special construction is deliberately adopted. Production type housings have been designed for such detectors, and it is desirable to avoid radical modification or redesign of such housings to permit the use of a dual detector system. Moreover, assuming that the hypothetical beta ray detector 22a of FIG. 9 is constructed so as to be substantially insensitive to X-rays, consider the effect of the beta ray absorber 94 thereon.

Figure 15:
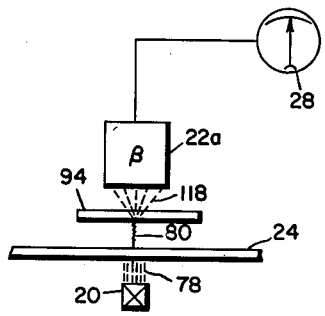
FIG. 15 is similar to FIG. 14, illustrating a radiation phenomenon associated with the operation thereof.

Referring to FIG. 15 it is seen that many X-rays as at 80, generated in the bombardment of material 24 by the beta rays 78 from source 20, will knock a shower of secondary electrons 118 out of the absorber 94. Being identical with beta rays, on striking the detector 22a these secondaries will induce a response therein, as is well known, for example, in the art of radiological monitoring. Thus the addition of the absorber 94 automatically converts the nominally X-ray insensitive beta ray detector to a substantially effective X-ray detector.

While it is of course desirable that the detector 22 be designed to have excellent sensitivity to both beta and X-radiation, it is seen from the above stated considerations that the only absolute requirement of the detector in that it be sensitive to beta radiation.

Figure 16:
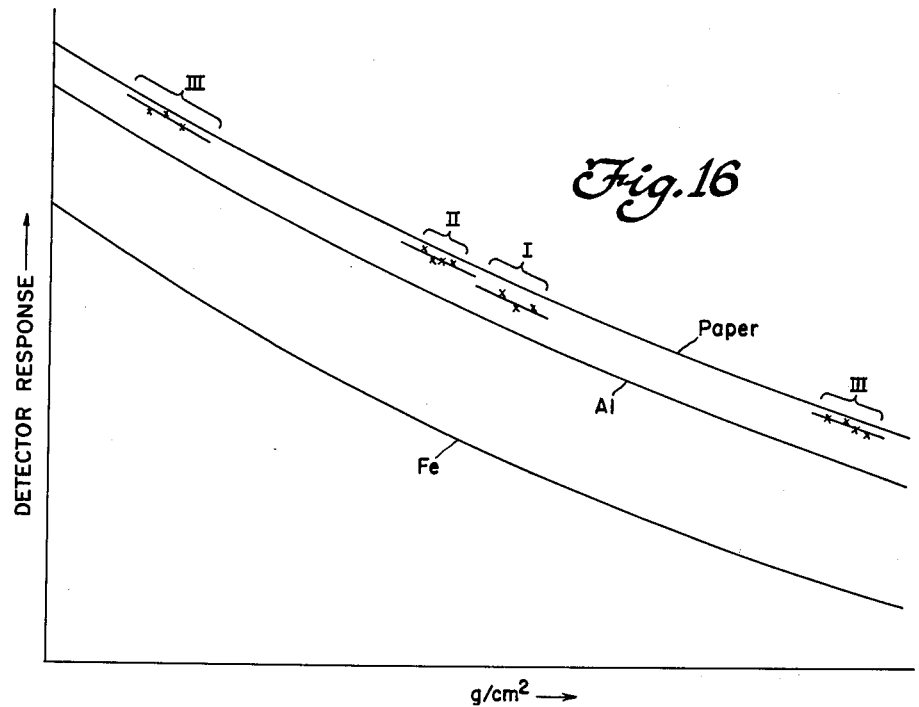
FIG. 16 is an enlarged portion of a graph showing absorption curves to illustrate a composition problem in a specific industrial beta gauging situation.

We have reduced the invention to practice by designing a geometry for an industrial beta gauge in accordance with FIG. 14. The problem involved was typical of composition difficulties as outlined heretofore. A sheet material manufacturer presented samples of materials run on the same processing machine. The specific compositions of these materials were not determined, but the samples appeared to be of generally organic composition and containing various amounts of different coloring compounds comprising metal salts such as, for example, lead chromate (chrome yellow) and titanium dioxide (white pigment). These samples were checked for composition error in a prior art beta gauge such as is represented by FIG. 5 by plotting their relative locations on absorption curves similar to those shown in FIG. 6. The results are illustrated by the enlarged section of the graph shown in FIG. 16, whereon the associated curves for paper, aluminum and steel are shown for reference. It was apparent that various groups of the samples fell on different absorption curves, as appears from the positions of adjacent groups I and II of plotted points which exhibit a mutual deviation of several percent in weight per unit area.

Figure 17:
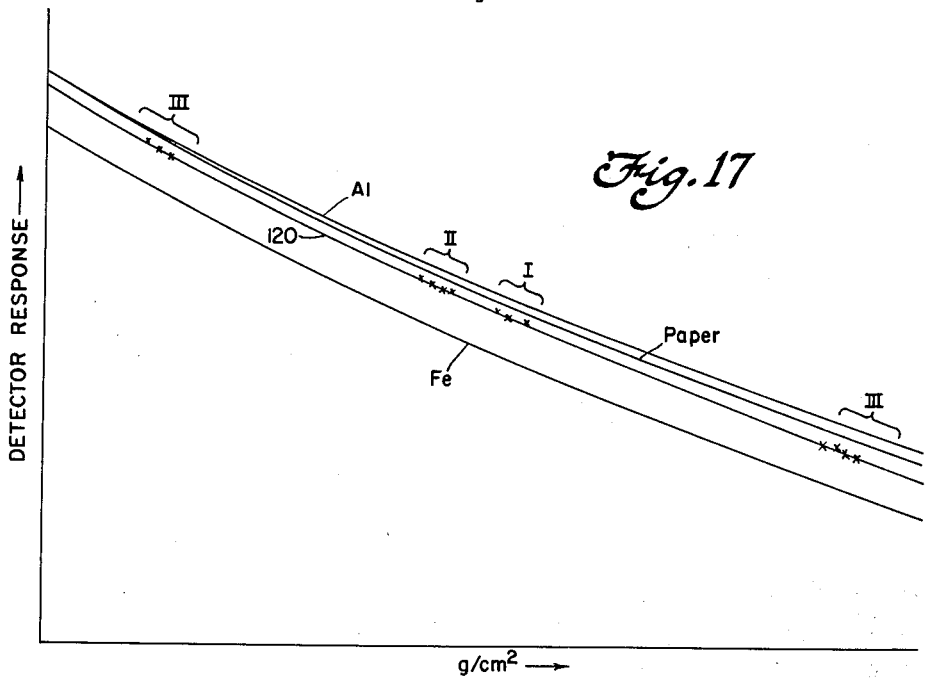
FIG. 17 is a graph similar to FIG. 16 showing the virtual elimination of composition error in the same situation by the method and means of the present invention.

After due experimentation, we constructed a gauge geometry in accordance with FIG. 14, and the results are shown in FIG. 17. Herein it is seen that the mutual composition deviation of the samples has been virtually eliminated, so that a single absorption curve 120 can be drawn through the plotted points for all groups of samples, thus achieving all practical objects of the invention as hereinabove set forth.

Figure 18:
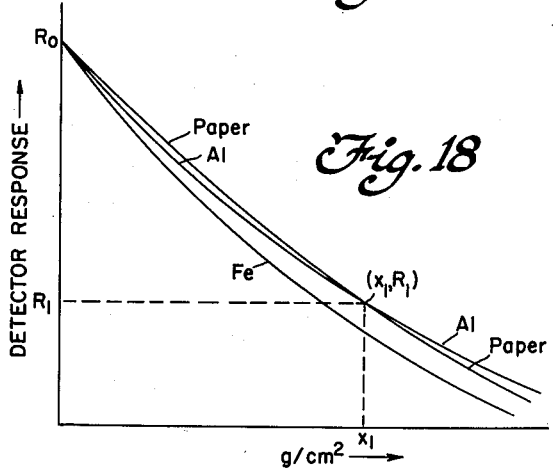
FIG. 18 is a more comprehensive view of the absorption curves of FIG. 17, illustrating certain general characteristics of a beta radiation gauge in accordance with the present invention.

In comparison with conventional beta gauge absorption curves (FIG. 16), FIG. 17 is characterized by the fact that all the absorption curves are much more closely grouped together. Moreover, it is seen that FIG. 17 is most unusual in that the absorption curve for paper falls below the curve for aluminum. This is not the case, however, for the entire expanse of the curves. Referring to FIG. 18, wherein the abscissae of FIG. 17 have been extended to zero thickness, it is seen that the curves extend from the point ($R_0$, $x_0$) somewhat in the manner of FIG. 6. With increasing thicknesses $x$ of material, however, the aluminum curve slowly rises until it crosses the paper curve at the point ($x_1, R_1$). This shows that if one were to use the gauge as calibrated to measure either paper or aluminum, or a mixture thereof, perfect composition insensitivity would obtain only for the particular thickness value $x_1$. We have observed that the magnitude of $x_1$, at the crossover point, depends as expected on the thickness of the filter absorber 94. That is to say, by properly selecting the thickness of filter 94, one can apparently locate the crossover point ($x_1$, $R_1$) to correspond to any given thickness of the material 24 in the practical range of thicknesses to be measured by the gauge.

From the discussion given hereinabove, particularly in connection with FIG. 5, it is apparent that the presence of X-rays 78 in the source emission tends to cancel the effect of the filter absorber 94 (FIG. 14). Hence if the source emission initially contains a higher percentage of X-ray energy, a thicker filter 94 must be used to attain the same degree of composition insensitivity. From FIG. 10 it is apparent that the thicker the filter which must be used, the greater the reduction ($R_0-R_0'$) in the detector output. Thus to obtain an adequate value of $R_0'$, it might be necessary to increase the activity of the beta source, which in turn may create the problem, among others, of having to increase the shielding of the source.

We therefore find it highly desirable to provide what may be termed a "low conversion environment" for the source. With reference to FIG. 4, a low conversion environment is provided by the use of one or more of the following expedients:

(1) Utilize a matrix or binder 44 material having as low Z as possible, preferably utilizing a material having an effective atomic number less than 20.

(2) Use a minimum of such binder material, and make the total thickness of radioactive material plus binder as thin as possible. This in combination with (1) minimizes the generation of X-rays 56 and 62.

(3) Make the source capsule 40 of low Z material, or if this is not practical, place a liner of low Z material at least 1000 mg./cm.² thick inside the capsule to absorb the beta rays which would otherwise bombard the capsule per se.

(4) Make the sealing barrier 46 of low Z material and as thin as practicable with all safety considerations in mind. This minimizes the generation of X-rays as at 66.

(5) Make the source window of low Z material and as thin as practicable. "Mylar" polyester film has been found to be an appropriate material for this purpose. This minimizes the generation of X-rays as at 68.

(6) Use a so-called "open geometry" to provide a minimum opportunity for the beta rays to strike the walls of any shielding or collimating device as at 74 before they arrive at the measured material. If shielding or collimating devices are necessary, use low Z materials, or line the shields or collimating devices with low Z material. This minimizes generation of X-rays as at 72.

In the gauge which provided the results shown in FIG. 17, and which was furnished to the sheet material manufacturer aforesaid, by reasons of expediency not all of the above measures could be effectively taken. Hence the $Sr^{90}$ source had only a fair low conversion environment. The filter 94 (FIG. 14) employed consisted of a stainless steel sheet having a thickness of about 280 mg./cm.². However, in a laboratory test, utilizing a good low conversion environment for the source, substantially the same absorption curves were obtained with a filter 94 of aluminum having a thickness of only about 40 mg./cm.². The latter result was obtained to some extent to the detriment of other desirable gauge characteristics, but nevertheless it demonstrates that with improved designs contemplated for the future, very good composition insensitivity can be attained without any substantial loss in detector output and without any necessity for increasing the acivity of sources.

Although as appears from the above discussion it is obviously advantageous to employ pure beta emitter radioisotopes as radiation sources, it is believed that one may also utilize any of the well known sources whose beta emission is accompanied by a gamma ray output, such as $Ru^{106}$, $Cs^{137}$ or $Kr^{85}$. In the case of $R^{106}$, this conclusion has been verified by experiments showing that this isotope is admirably suited to the composition insensitive geometry.

While the invention has been herein shown and described in connection with specific procedures and apparatus, the same are meant to be illustrative only and not restrictive, since it is clear that many changes and modifications can be made without departing from the spirit and scope of the invention as is set forth in the appended claims. By way of one example, it is apparent that the filter absorber 94 of FIG. 14 need not be completely separate from the detector 22, but could be made, say, as an integral part of an ionization chamber window 22w.

What is claimed is:

1. In a radiation gauge having a beta radiation source and radiation detecting means disposed on opposite sides of a material for measuring the same, the improvement wherein said detecting means comprises means for generating a signal having a first component responsive to the beta radiation transmitted by said material and a second component responsive to the X-rays generated in said material as a result of the bombardment thereof by the beta radiation from said source, and means for adjusting the magnitude of one of said signal components in a direction approaching the magnitude of the other of said signal components.

2. Apparatus as in claim 1 wherein said adjusting means comprises a beta radiation absorber mounted between said material and the active detecting portion of said detecting means, said absorber having a thickness sufficient to substantially reduce any variations in the output of said detecting means as a result of composition variations in said material.

3. Apparatus as in claim 1 wherein said detecting means comprises a beta radiation detector for providing said first signal component, an X-radiation detector for providing said second signal component, and means for adding the outputs of said detectors.

4. Apparatus as in claim 1 wherein said detecting means comprises a beta radiation detector for providing a first electrical output responsive to said transmitted beta radiation, an X-radiation detector for providing a second electrical output responsive to said generated X-rays, means for attenuating said first output, and means for combining said attenuated output with said second output.

5. Apparatus as in claim 1 wherein said detecting means comprises a beta radiation detector for providing a first electrical output responsive to said transmitted beta radiation, means for amplifying said output to provide a first amplified signal, an X-radiation detector for providing a second electrical output responsive to said generated X-rays and means for amplifying said second output to provide a second amplified signal, and wherein said adjusting means comprises means for adjusting the amplitude of one of said amplified signals and means for adding said adjusted signal to the other of said amplified signals.

6. In a radiation gauge for measuring the mass of a material subject to composition variations, a radiation source for providing a first beam of predominantly beta radiation directed into one side of said material and having sufficient energy to penetrate said material thereby forming on the opposite side thereof a second composite beam of predominantly beta radiation transmitted by said material but including a minor component of X-rays generated therein by the bombardment of said beta rays, a beta ray detector located on said opposite side of said material, and a filter mounted between said detector and said material for attenuating the beta rays in said second composite beam and for generating secondary electrons as a result of the bombardment of said filter by said X-rays in said composite beam thereby rendering said beta ray detector responsive to said X-rays, wherein said filter comprises a beta ray absorber having sufficient thickness to attenuate the beta radiation incident thereon to such an extent that changes in the response of said detector to said beta rays resulting from composition variations in said material are substantially canceled by the opposite changes in its response to said secondary electrons.

7. Apparatus as in claim 6 wherein said radiation source comprises a beta emitting radioisotope, and container means providing a low conversion environment therefor.

8. In a radiation gauge having a beta radiation source and radiation detecting means disposed on opposite sides of a material for measuring the same, the improvement which comprises a low conversion environment for said source, wherein said detecting means comprises means for generating a signal having a first component responsive to the beta radiation transmitted by said material and a second component responsive to the X-rays generated in said material as a result of the bombardment thereof by the beta radiation from said source, and means for adjusting the magnitude of one of said signal components in a direction approaching the magnitude of the other of said signal components, said adjusting means comprising a beta radiation absorber mounted between said material and the active detecting portion of said detecting means, said absorber having a thickness sufficient to substantially reduce any variations in the output of said detecting means as a result of composition variations in said material.

References Cited in the file of this patent

UNITED STATES PATENTS

| | | |
|---|---|---|
| 2,642,537 | Carroll et al. | June 16, 1953 |
| 2,890,347 | McCormick | June 9, 1959 |
| 2,937,276 | Thourson | May 17, 1960 |

FOREIGN PATENTS

| | | |
|---|---|---|
| 816,062 | Great Britain | July 8, 1959 |